(12) United States Patent
Karthikeyan

(10) Patent No.: US 11,985,211 B2
(45) Date of Patent: May 14, 2024

(54) DYNAMIC HASHING FRAMEWORK FOR SYNCHRONIZATION BETWEEN NETWORK TELEMETRY PRODUCERS AND CONSUMERS

(71) Applicant: Cisco Technology, Inc., San Jose, CA (US)

(72) Inventor: Kishore Karthikeyan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/696,493

(22) Filed: Mar. 16, 2022

(65) Prior Publication Data

US 2023/0300218 A1 Sep. 21, 2023

(51) Int. Cl.
*H04L 67/60* (2022.01)
*H04L 43/08* (2022.01)

(52) U.S. Cl.
CPC .............. *H04L 67/60* (2022.05); *H04L 43/08* (2013.01)

(58) Field of Classification Search
CPC ....... H04L 67/60; H04L 43/08; H04L 67/562; H04L 67/104; H04L 67/56
See application file for complete search history.

(56) References Cited

U.S. PATENT DOCUMENTS

| | | | | |
|---|---|---|---|---|
| 11,070,421 B2 * | 7/2021 | Berdy | ..................... | H04L 67/56 |
| 11,196,841 B1 | 12/2021 | Ovadia | | |
| 11,887,129 B1 * | 1/2024 | Amir | ..................... | H04L 63/08 |
| 2010/0321204 A1 | 12/2010 | Bae et al. | | |
| 2016/0204992 A1 | 7/2016 | Wu et al. | | |
| 2016/0234087 A1 | 8/2016 | Nyerges et al. | | |
| 2017/0353367 A1 | 12/2017 | Slaight et al. | | |
| 2018/0081911 A1 * | 3/2018 | Mowatt | ............... | G06F 16/2365 |
| 2021/0334132 A1 * | 10/2021 | Metz | ..................... | G06F 16/27 |
| 2021/0357245 A1 * | 11/2021 | Cherivirala | ......... | G06F 9/45558 |

FOREIGN PATENT DOCUMENTS

| | | | |
|---|---|---|---|
| CN | 113098692 A | 7/2021 | |
| WO | WO2016134267 A1 | 8/2016 | |
| WO | WO-2021069112 A1 * | 4/2021 | ........... G06F 21/602 |
| WO | WO-2022122789 A1 * | 6/2022 | |

OTHER PUBLICATIONS

PCT Search Report and Written Opinion dated Jul. 6, 2023 for PCT application No. PCT/US23/15269, 9 pgs.

* cited by examiner

*Primary Examiner* — Hitesh Patel
(74) *Attorney, Agent, or Firm* — Lee & Hayes P.C.

(57) ABSTRACT

A telemetry producer sends a hello message to a telemetry registration interface. The interface returns a hello message. The producer sends a producer protocol suite to the interface. An acceptance of the protocol suite and an indication that the protocol suite has been forwarded to a telemetry registration controller is returned. The producer sends a hello message to the controller. The controller returns an acknowledgement and a producer identifier (ID). A second hello message and the producer ID is sent from the producer to the controller. The controller returns a second acknowledgement and the producer ID, indicating the producer registration. A telemetry consumer sends the controller a hello message. An acknowledgement with a consumer identifier (ID), is returned to the consumer. The consumer sends a consumer request packet to the controller. The controller sends the producer ID, and an indication of consumer registration to the consumer.

19 Claims, 7 Drawing Sheets

DYNAMIC HASHING FRAMEWORK FOR SYNCHRONIZATION BETWEEN NETWORK TELEMETRY PRODUCERS AND CONSUMERS

TECHNICAL FIELD

The present disclosure relates generally to dynamic synchronization between telemetry producers and consumers at runtime by implementing a telemetry registration framework.

BACKGROUND

In computer networking, network telemetry is increasingly important as the volume of network data and network size continues to increase. Network telemetry, the process of collecting measurements and other data from remote network devices (e.g., switches and routers) and transmitting them to another location for analysis, can be used to monitor the health of network devices and pinpoint any problem areas accurately and quickly. Network telemetry enables network operators to address network blind spots proactively, improve availability and security, and maintain network operations efficiently. Network telemetry can accelerate network troubleshooting, increase network capacity, and improve network performance and user experience.

Today, data is typically collected from network devices by a telemetry producer and published, or sent to a centralized message broker. A telemetry consumer then subscribes to, or requests the data from the message broker for processing and analysis. In order for a telemetry consumer to subscribe to the telemetry data published by a telemetry producer, the telemetry producer and telemetry consumer must agree on certain parameters in advance. This agreement, or static synchronization between a telemetry producer and a telemetry consumer is achieved at compile time. A telemetry consumer relies on available telemetry producer documentation time to design a subscription strategy and hashing mechanism for telemetry data consumption. Thus, all the telemetry consumers for a given telemetry producer, must have the same fixed design that does not allow for scaling, flexibility, or dynamic runtime changes.

Thus, in order to improve network telemetry data consumption, there is a need for a dynamic runtime consensus between telemetry producers and telemetry consumers that allows for greater flexibility, scaling consumption based on user need, adding more consumers, and runtime changes.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
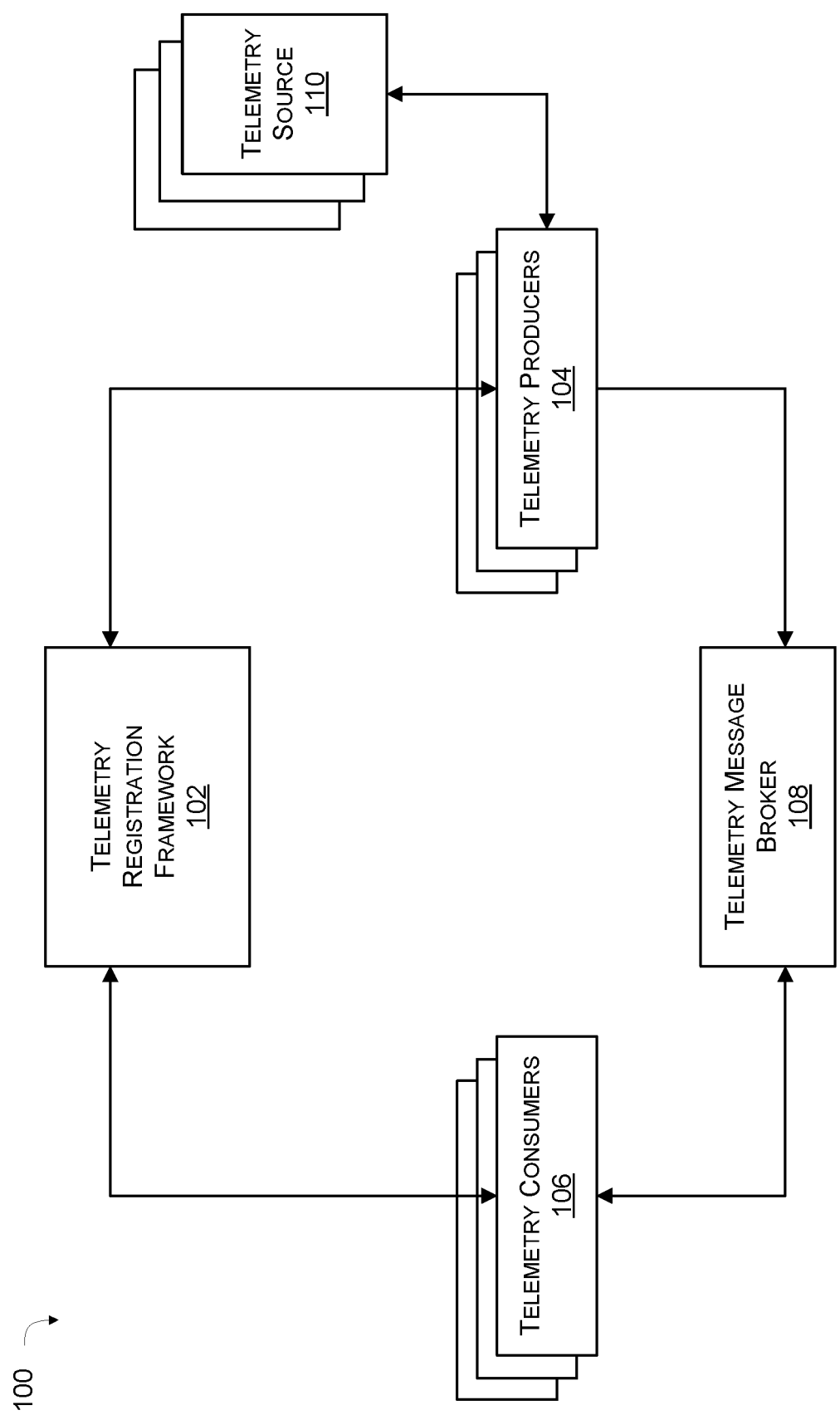
FIG. 1 illustrates a system architecture diagram of an example of a network in which a telemetry registration framework is used for a dynamic consensus between a telemetry producer and a telemetry consumer.

This disclosure describes techniques for dynamic consensus between telemetry producers and telemetry consumers using a telemetry registration framework. Examples described herein provide a system including a processor and a non-transitory computer-readable media storing instructions that, when executed by the processor, cause the processor to perform operations. The operations include assigning, by a telemetry registration controller, a unique telemetry producer identifier (ID) to a telemetry producer, registering parameters associated with the telemetry producer with the telemetry registration controller, storing the telemetry producer ID and the parameter associated with the telemetry producer in a telemetry registration database, assigning, by the telemetry registration controller, a unique telemetry consumer ID to a telemetry consumer, registering parameters associated with the telemetry consumer with the telemetry registration controller, storing the telemetry consumer ID and the parameters associated with the telemetry consumer in the telemetry registration database, determining, that the parameters associated with the telemetry producer are compatible with the parameters associated with the telemetry consumer, and requesting, by the telemetry consumer, telemetry data from a telemetry message broker that has been published by the telemetry producer.

In some cases, the telemetry registration controller is capable of registering multiple telemetry producers and multiple telemetry consumers concurrently.

According to some implementations, the telemetry registration controller is a centralized controller with a scale-out architecture.

In various instances, the telemetry database is a strongly consistent key value database.

Some examples described herein provide a system including a processor and a non-transitory computer-readable media storing instructions that, when executed by the processor, cause the processor to perform operations. The operations include registering a telemetry producer with a telemetry registration controller. The registering includes receiving, by a telemetry registration interface and from a telemetry producer, a first message including a telemetry producer hello message, transmitting, by the telemetry registration interface and to the telemetry producer, a second message including a telemetry registration interface hello message, receiving, by the telemetry registration interface and from the telemetry producer, a third message including a telemetry producer protocol suite, transmitting, by the telemetry registration interface and to the telemetry registration controller, the third message, transmitting, by the telemetry registration interface and to the telemetry producer, a fourth message including an acceptance of the telemetry producer protocol suite and indicating the telemetry producer protocol suite has been forwarded to the telemetry registration controller, receiving, by the telemetry registration interface and from the telemetry producer, a fifth message including a second telemetry producer hello message, transmitting, by the telemetry registration interface and to the telemetry registration controller, the fifth message, receiving, by the telemetry registration interface and from the telemetry registration controller, a sixth message including a telemetry registration controller acknowledgement and an assignment of a unique telemetry producer identifier (ID), transmitting, by the telemetry registration interface and to the telemetry producer, the sixth message, receiving, by the telemetry registration interface and from the telemetry producer, a seventh message including a third telemetry producer hello message with the unique telemetry producer ID, transmitting, by the telemetry registration interface and to the telemetry registration controller, the seventh message, transmitting, by the telemetry registration controller and to a telemetry registration database, an eighth message including instructions to store a telemetry producer registration for the telemetry producer including the telemetry producer protocol suite and the unique telemetry producer ID, storing, by the telemetry registration database, the telemetry producer registration for the telemetry producer including the telemetry producer protocol suite and the unique telemetry producer ID, receiving, by the telemetry registration interface and from the telemetry registration controller, a ninth message including a second telemetry registration controller acknowledgement and the unique telemetry producer ID, indicating acceptance a registration of the telemetry producer with the telemetry registration controller, and transmitting, by the telemetry registration interface and to the telemetry producer, the eighth message.

In some cases, the computer-readable media is further configured to cause the one or more processors to perform act including registering a telemetry consumer with the telemetry registration controller. The registering includes receiving, by the telemetry registration interface and from the telemetry consumer, a first message including a telemetry consumer hello message, transmitting, by the telemetry registration interface and to the telemetry registration controller, the first message, receiving, by the telemetry registration interface and from the telemetry registration controller, a second message including a telemetry registration controller acknowledgement with an assignment of a unique telemetry consumer identifier (ID) for the telemetry consumer, transmitting by the telemetry registration interface and to the telemetry consumer, the second message, receiving, by the telemetry registration interface and from the telemetry consumer, a third message including a telemetry consumer request packet with a list of telemetry consumer parameters the telemetry consumer is capable of utilizing to consume telemetry data, transmitting, by the telemetry registration interface and to the telemetry registration controller, the third message, transmitting, by the telemetry registration controller and to the telemetry registration database, a fourth message including instructions to store a telemetry consumer registration for the telemetry consumer including the list of telemetry consumer parameters the telemetry consumer is capable of utilizing to consume telemetry data and the unique telemetry consumer ID, storing, by the telemetry registration database, the telemetry consumer registration for the telemetry consumer including the list of telemetry consumer parameters the telemetry consumer is capable of utilizing to consume telemetry data and the unique telemetry consumer ID, querying the telemetry registration database for a telemetry producer capable of producing telemetry data compatible with the list of telemetry consumer parameters the telemetry consumer is capable of utilizing to consume telemetry data, receiving, by the telemetry registration controller and from the telemetry registration database, a fifth message including a telemetry producer ID associated with a telemetry producer having a telemetry producer protocol suite compatible with the list of telemetry consumer parameters the telemetry consumer is capable of utilizing to consume telemetry data, receiving, by the telemetry registration interface and from the telemetry registration controller, the fifth message, and transmitting, by the telemetry registration interface and to the telemetry consumer, the fifth message.

Some examples further include transmitting by the telemetry consumer and to a telemetry message broker, a sixth message requesting telemetry data that has been published by the telemetry producer associated with the telemetry producer ID.

In some implementations, the list of telemetry consumer parameters the telemetry consumer is capable of utilizing to consume telemetry data includes a list of types of collection protocol that the telemetry consumer can support, a number of unique keys in a telemetry message, a list of available serialization formats the telemetry consumer can support, a list of available sensor paths, and a list of available hashing mechanisms the telemetry consumer is compatible with.

In some cases, registering a telemetry consumer with the telemetry registration controller includes registering a first telemetry consumer and the list of telemetry consumer parameters is a first list of telemetry consumer parameters, and also includes registering a second telemetry consumer with the telemetry registration controller wherein a second list of telemetry consumer parameters the second telemetry consumer is capable of utilizing is different that the first list of telemetry consumer parameters the first telemetry consumer is capable of utilizing.

According to some instances, a telemetry producer ID associated with a telemetry producer capable of producing telemetry data compatible with the second list of telemetry consumer parameters the second telemetry consumer is capable of utilizing is a same telemetry producer ID associated with a same telemetry producer capable of producing telemetry data compatible with the first list of telemetry consumer parameters the first telemetry consumer is capable of utilizing.

In some implementations, the telemetry registration controller is capable of registering multiple telemetry producers concurrently.

According to some examples, the telemetry registration interface is a multi-protocol registration interface.

In various examples, the telemetry producer protocol suite includes a list of types of collection protocol that the telemetry producer can support. a number of keys that can be collected, a list of available serialization formats the telemetry producer can support, a list of available sensor paths, and a list of available hashing mechanisms the telemetry producer is compatible with.

Examples described herein also provide a method implemented at least in part by a telemetry registration interface, the method including receiving, from the telemetry producer, a first message comprising a telemetry producer hello message, transmitting, to the telemetry producer, a second message comprising a telemetry registration interface hello message, receiving, from the telemetry producer, a third message comprising a telemetry producer protocol suite, transmitting, to the telemetry registration controller, the third message, transmitting, to the telemetry producer, a fourth message comprising an acceptance of the telemetry producer protocol suite and indicating the telemetry producer protocol suite has been forwarded to the telemetry registration controller, receiving, from the telemetry producer, a fifth message comprising a second telemetry producer hello message, transmitting, to the telemetry registration controller, the fifth message, receiving, from the telemetry registration controller, a sixth message comprising a telemetry registration controller acknowledgement and a unique telemetry producer identifier (ID) assignment, transmitting, to the telemetry producer, the sixth message, receiving, from the telemetry producer, a seventh message comprising a second telemetry producer hello message and the unique telemetry producer ID, transmitting, to the telemetry registration controller, the seventh message, receiving, from the telemetry registration controller, an eighth message comprising a second telemetry registration controller acknowledgement and the unique telemetry producer ID, indicating the telemetry producer is registered with the telemetry registration controller, transmitting, to the telemetry producer, the eighth message, receiving, from the telemetry consumer, a ninth message comprising a telemetry consumer hello message, transmitting, to the telemetry registration controller, the ninth message, receiving, from the telemetry registration controller, a tenth message comprising a telemetry registration controller acknowledgement with a unique telemetry consumer identifier (ID) assignment, transmitting, to the telemetry consumer, the tenth message, receiving, from the telemetry consumer, an eleventh message comprising a telemetry consumer request packet with a list of telemetry consumer parameters the telemetry consumer is capable of utilizing to consume telemetry data, transmitting, to the telemetry registration controller, the eleventh message, receiving, from the telemetry registration controller, a twelfth message comprising the unique telemetry producer ID and indicating the telemetry consumer is registered with the telemetry registration controller, and transmitting, to the telemetry consumer, the twelfth message.

In various examples the method is initiated at runtime.

In some implementations, the telemetry registration controller is capable of registering multiple telemetry producers and multiple telemetry consumer concurrently.

In some cases, the telemetry producer is compatible with multiple telemetry consumers having a variety of telemetry consumer parameters.

Additionally, the techniques described herein may be performed by a system and/or device having non-transitory computer-readable media storing computer-executable instructions that, when executed by one or more processors, performs the method described above.

Example Embodiments

Generally, for work-load processing between telemetry producers, client applications that publish or write telemetry events, and telemetry consumers, client applications that subscribe to or read and process these events, a centralized messaging broker (e.g. Apache Kafka) is used as a messaging platform. However, to successfully communicate using a messaging broker, telemetry producers and telemetry consumers must agree on several parameter in advance in order for a telemetry consumer to successfully consume the telemetry data published by the telemetry producer. This synchronization between a telemetry producer and a telemetry consumer is presently achieved at design time by having a shared model from which to design and build the communication strategy. Typically, a telemetry consumer will rely on available telemetry producer documentation in order to design and build a subscription strategy. Once built, the producer and consumer are instantiated as a microservice and they interact with a telemetry message broker, such as Kafka, in order for the telemetry consumer to consume and process telemetry data. Once a synchronization strategy is agreed upon and instantiated, it cannot be altered without a complete rebuilding of the subscription strategy.

When a customer upgrades or changes network resources, expands network resources, changes or adds specific data to be collected, or in any other way plans to incorporate changes to network resources or telemetry data collection, the telemetry producer and consumer must agree on a new model and start the process from the beginning. The telemetry producer redesigns, provides new documentation for the new agreed upon model, and the telemetry consumer redesigns and rebuilds according to the producer documentation, resulting in a lengthy production cycle before deployment. This redesigning and rebuilding process results in significant monetary expenditure as well as significant time delays.

This disclosure describes techniques for dynamic synchronization between telemetry producers and telemetry consumers that are achieved at runtime and allows for runtime changes in network resources as well as changes in telemetry data collection requirements. This dynamic synchronization is achieved with a telemetry registration framework to negotiate between telemetry producers and telemetry consumers at runtime, thus eliminating the redesign and rebuild process required to implement changes required with the current static synchronization process.

A telemetry registration framework eliminates the need for a telemetry producer and a telemetry consumer to agree on parameters at design time, and serves as a negotiator to find, and pair, a telemetry producer with a telemetry consumer that having compatible parameters, at runtime. A telemetry producer communicates with a telemetry registration interface and sends the telemetry registration interface a list of parameters that the telemetry producer is capable of utilizing to publish telemetry data. The telemetry registration interface sends this information to a telemetry registration controller, the telemetry registration controller assigns a unique telemetry producer identifier (ID) to the telemetry producer, and a telemetry registration database stores the telemetry producer parameters along with the telemetry producer ID, effectively registering the telemetry producer with the telemetry registration framework. At runtime, a telemetry consumer communicates, to the telemetry registration controller via the telemetry registration interface, a list of parameters that the telemetry consumer is capable of utilizing to consume telemetry data. The telemetry registration controller registers the telemetry consumer and assigns a unique telemetry consumer ID to the telemetry consumer. The telemetry registration database stores the telemetry consumer ID along with the list of telemetry consumer parameters. The telemetry registration controller queries the telemetry registration database for a telemetry producer ID associated with a telemetry producer that has parameters compatible with those of the telemetry consumer, and once found, the telemetry producer ID is sent to the telemetry consumer. When the telemetry consumer receives the telemetry producer ID, the telemetry consumer can request telemetry data from the compatible telemetry producer through a centralized telemetry message broker.

When a telemetry producers registers with the telemetry registration controller, the telemetry producer send a list of all the types of all the parameter that the telemetry producer is capable of utilizing to produce and publish telemetry data. The primary parameters that the telemetry producer provides for registration are a type of collection protocol (e.g. simple network management protocol (SNMP), model driven telemetry (MDT), command line interface (CLI), Google network management interface (gNMI), YANG, or any other available collection protocol including custom protocols), a number of keys or how many types of data can be collected, a serialization or messaging format (e.g. Javascript object notation (JSON), key-value Google protocol buffers (KVGPB), Protobuf, Avro encoding, Crosswork encoding, or any other applicable messaging format including a custom format), available sensor paths, and a hashing mechanism. In some examples, secondary parameters may also be included, such as a type of operating system, security of collection (credentials, TLS, mutual TLS, etc.), and device vendor. Each telemetry producer may support one or more than one of each of the different parameters discusses above. Thus, making each telemetry producer compatible with multiple telemetry consumers with a variety of functionalities.

Similarly, when a telemetry consumer registers with the telemetry registration framework, the telemetry consumer communicates with the telemetry registration controller via the telemetry registration interface. The telemetry registration controller assigns a unique telemetry consumer identifier (ID) to the telemetry consumer. The telemetry consumer then send the telemetry registration controller, via the telemetry registration interface, a telemetry consumer request packet with a list of all the telemetry consumer parameters the telemetry consumer is capable of utilizing to consume telemetry data. The telemetry consumer ID, along with the telemetry consumer parameters, are stored in the telemetry registration database, effectively registering the telemetry consumer with the telemetry registration framework. The telemetry registration controller then queries the database for a telemetry producer ID associated with a telemetry producer that has telemetry producer parameters that are compatible with the telemetry consumer parameters. When a compatible telemetry producer is found, the telemetry registration controller sends the telemetry producer ID of the compatible telemetry producer to the telemetry consumer via the telemetry registration interface. Once the telemetry consumer receives the telemetry producer ID of the compatible telemetry producer, the telemetry consumer can send a request for telemetry data to the compatible telemetry producer through a telemetry message broker.

The telemetry consumer request packet with the list of all the types of all the telemetry consumer parameters the telemetry consumer is capable of utilizing to consumer telemetry data, is similar to the list of telemetry producer parameters that a telemetry producer uses to register with the telemetry controller. The primary parameters that the telemetry consumer uses to register with the telemetry registration controller are a type of collection protocol, a number of keys or how many types of data can be collected, a serialization or messaging format, available sensor paths and a hashing mechanism. Each telemetry consumer may support one or more than one of each of the different parameters.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system architecture diagram of an example implementation of a telemetry registration framework for dynamically synchronizing telemetry producers and telemetry consumers. System architecture 100 includes a telemetry registration framework 102 (described in further detail below with reference to FIG. 2) for registering telemetry producers 104 and telemetry consumer 106. System architecture 100 also includes a telemetry message broker 108, for example Kafka, for facilitating messaging and communication between the telemetry producer 104 and the telemetry consumer 106. System architecture 100 also illustrates the telemetry source 110 from which the telemetry producers collect telemetry data for publication.

Telemetry producers 104 register with a telemetry registration framework 102 which is described below in detail with reference to FIG. 3. Telemetry consumers 106 also register with the telemetry registration framework which is described below in detail with reference to FIG. 4. Once a telemetry producer 104 is registered, the telemetry producer 104 collects telemetry data from a telemetry source 110, such as network resources (e.g. various hardware devices, such as routers, switches, gateways, smart NICs, NICs, ASICs, FPGAs, servers, and/or any other type of device) and publishes the telemetry data to a telemetry message broker 108 (e.g. Apache Kafka, Amazon SNS, Azure Service Buss, Google Cloud Pub/Sub, or any other appropriate pub/sub platform). Once a telemetry consumer 106 is registered, the telemetry consumer 106 receives a telemetry producer ID of a telemetry producer 104 that has compatible parameters. The telemetry consumer 106, can then subscribe to consumer telemetry data from the telemetry message broker 108 that has been published by the telemetry producer 104.

Figure 2:
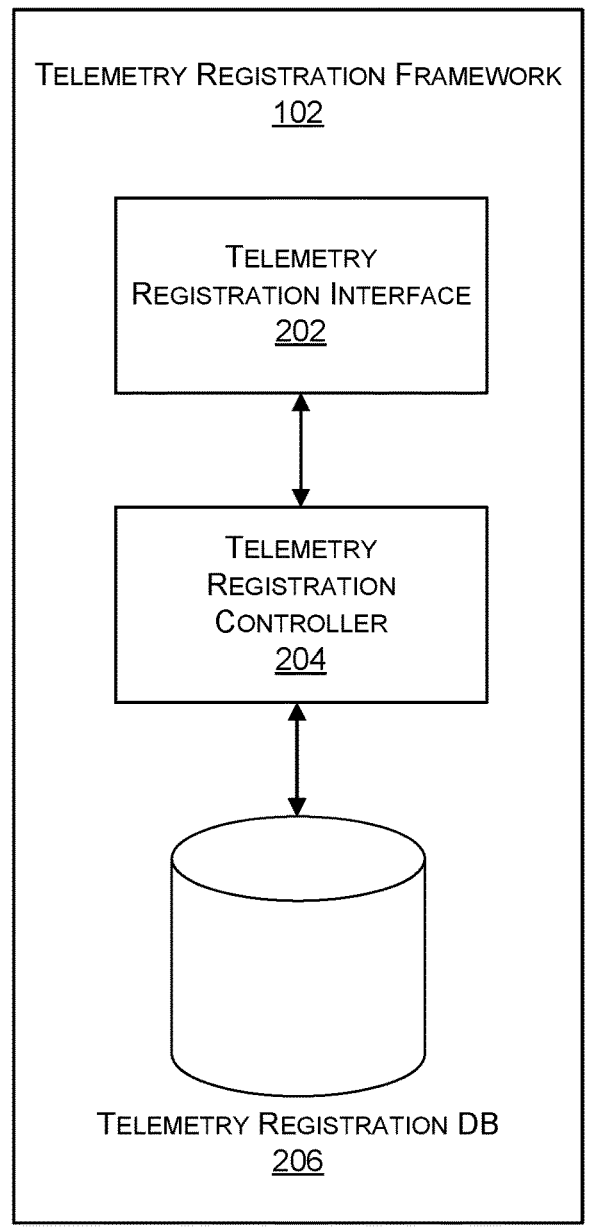
FIG. 2 illustrates a detailed view of a telemetry registration framework.

FIG. 2 illustrates an example 200 of a telemetry registration framework 102 for registering telemetry producers and telemetry consumers to facilitate a dynamic runtime synchronization between compatible telemetry producers and telemetry consumers. The illustrated telemetry registration framework includes a telemetry registration interface 202. The telemetry registration interface 202 is a multi-protocol interface capable of facilitating communication between a telemetry registration controller 204 and multiple telemetry producers and multiple telemetry consumers with varying protocol capabilities. Thus, regardless of the protocol used by a telemetry producer or a telemetry consumer, the telemetry registration interface 202 can facilitate communication with the telemetry registration controller 204. Example 200 of the telemetry registration framework also includes a telemetry registration controller 204. The telemetry registration controller 204 is a centralized controller with a scale-out architecture. The telemetry registration controller 204 is capable of registering multiple telemetry producers and multiple telemetry consumer concurrently. Additionally, the telemetry registration controller 204 can register telemetry producers and telemetry consumers in any order. Finally, the telemetry registration framework 102 also includes a telemetry registration database 206. The telemetry registration database 206 is a strongly consistent database (e.g. etcd, Redis, or any other applicable database) with raft consensus. The telemetry registration database 206 stores each telemetry producer and telemetry consumer registration, including the unique ID's assigned by the telemetry registration controller 204 and the parameters each telemetry producer and telemetry consumer are capable of unitizing to produce and consumer telemetry data respectively.

The dynamic synchronization achieved by employing the telemetry registration framework 102 dramatically increases the flexibility of injecting runtime telemetry consumers into the network management controller and is adaptable to different customer deployment and data models. This enables the optimization of telemetry function packs to be developed and dynamically inserted leveraging the hashing framework to process messages rapidly. Additionally, a dynamic consensus allows for a run-time change of a telemetry producer without affecting telemetry consumers. Whereas with a traditional static synchronization, the telemetry producer cannot be changed, due to strong coupling all telemetry producers and telemetry consumers have to be changed simultaneously creating a huge bottleneck for upgrading a producer. However, by leveraging the telemetry registration framework 102 a telemetry producer is compatible with multiple telemetry consumers having varied functionality. In addition, the telemetry registration framework 102 allows for horizontal and vertical scaling seamlessly to handle increased throughput and availability.

Figure 3:
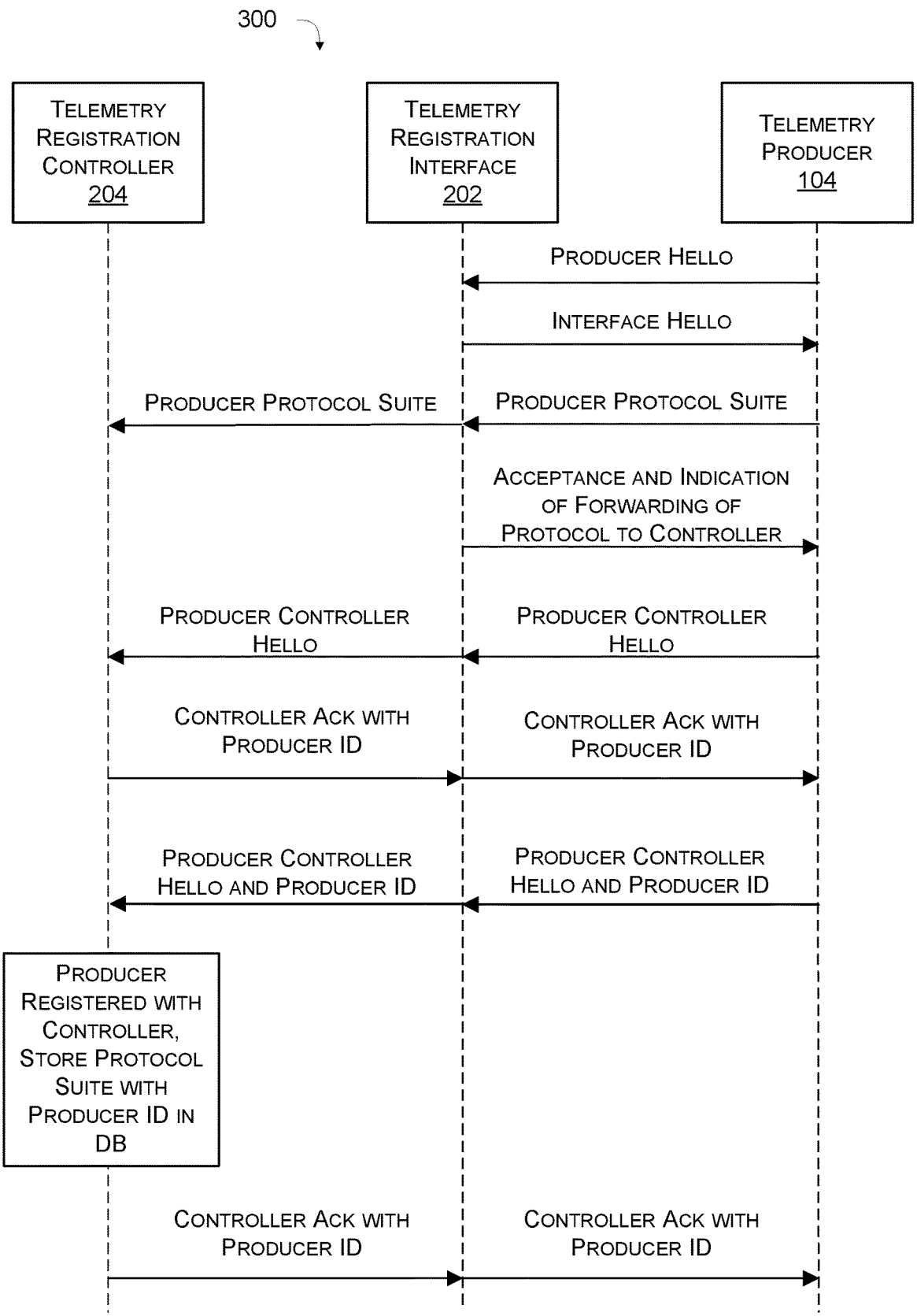
FIG. 3 illustrate an example of a telemetry producer registering with a telemetry registration framework.

FIG. 3 illustrates a detailed example 300 of a telemetry producer 104 registering with a telemetry registration framework as described above with reference to FIG. 2. A telemetry producer 104 sends a hello message to a telemetry registration interface 202. The telemetry registration interface 202 returns a hello message to the telemetry producer 104. The telemetry producer 104 sends a message including a telemetry producer protocol suite to the telemetry registration interface 202. The telemetry producer protocol suite includes a list of all the types of all the parameters the telemetry producer 104 is capable of utilizing to produce telemetry data, as discussed above with reference to FIG. 1. The telemetry registration interface 202 forwards the message with the telemetry producer protocol suite to a telemetry registration controller 204 and sends a message including an acceptance of the telemetry producer protocol suite and an indication of forwarding the telemetry producer protocol suite to the telemetry registration controller 204, back to the telemetry producer 104. The telemetry producer 104 sends a hello message to the telemetry registration controller 204 via the telemetry registration interface 202. The telemetry registration controller 204 sends a message back to the telemetry producer 104 via the telemetry registration interface 202 that includes a telemetry registration controller acknowledgement and an assignment of a unique telemetry producer ID. The Telemetry producer 104 sends the telemetry registration controller 204, via the telemetry registration interface, another hello message with the telemetry producer ID that has been assigned. When the telemetry registration controller receives this message, the telemetry producer 104 is effectively registered with the telemetry registration controller 204, and the telemetry producer ID along with the telemetry protocol suite is stored in the telemetry registration database. The telemetry registration controller 204 sends the telemetry producer 104, via the telemetry registration interface 202, another telemetry controller acknowledgement with the telemetry producer ID. At this point, the telemetry producer 104 is registered with the telemetry registration framework and ready to start publishing telemetry data to a telemetry message broker as described above and illustrated in FIG. 1.

Figure 4:
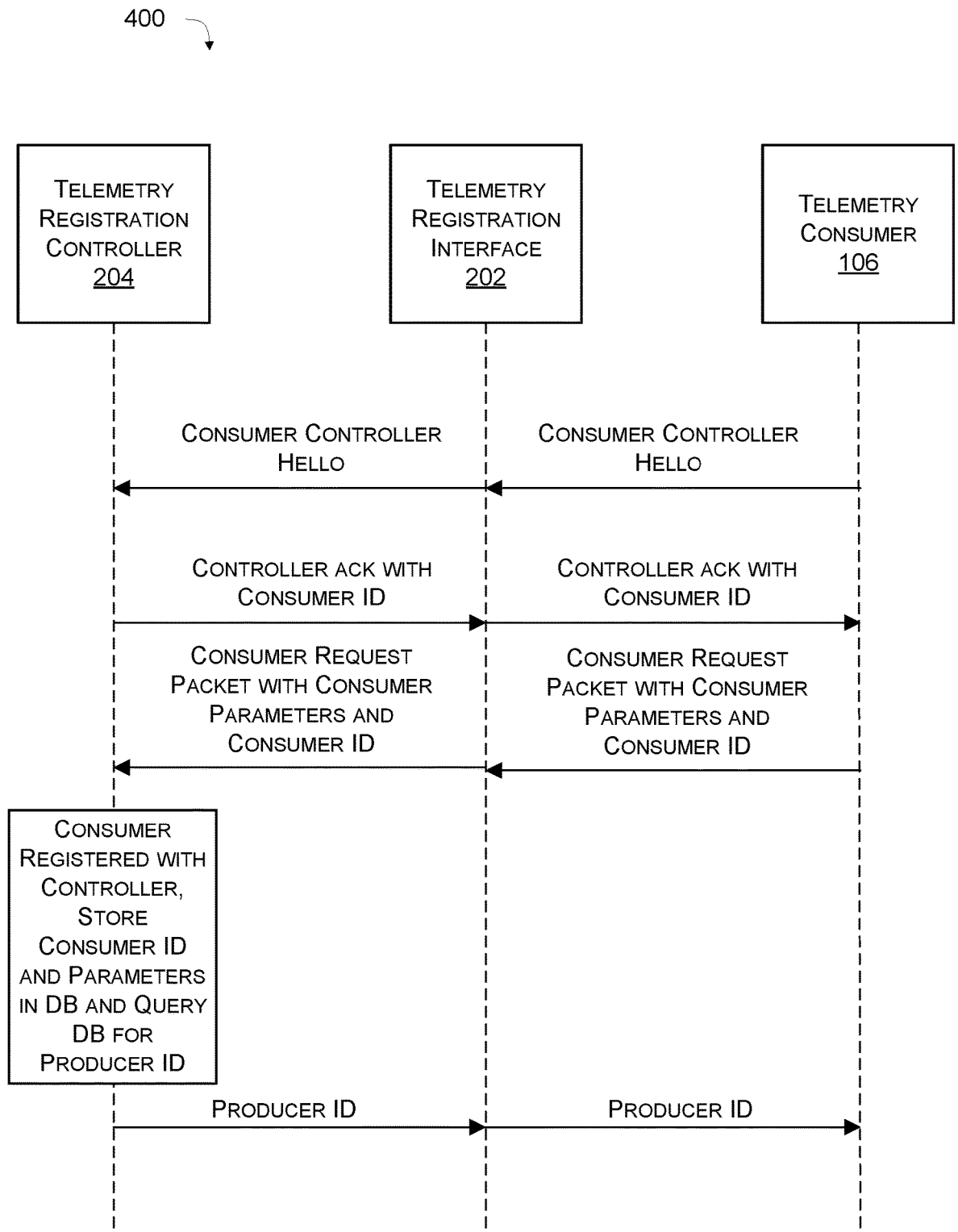
FIG. 4 illustrates an example of a telemetry consumer registering with a telemetry registration framework.

FIG. 4 illustrates a detailed example 400 of a telemetry consumer 106 registering with a telemetry registration framework as described above with reference to FIG. 2. A telemetry consumer 106 sends a hello message to a telemetry registration controller 204 via a telemetry registration interface 202. The telemetry registration controller 204 returns an acknowledgement with an assignment of a unique telemetry consumer ID. The telemetry consumer 106 then sends a telemetry consumer request packet, with a list of all the types of all the parameters the telemetry consumer is capable of utilizing to consume telemetry data, and the telemetry consumer ID to the telemetry registration controller 204 via the telemetry registration interface 202. At this point, the telemetry consumer is effectively registered with the telemetry registration controller 204, and the telemetry consumer ID and telemetry consumer parameters are stored in the telemetry registration database. The telemetry registration database is then queried to find a telemetry producer ID for a telemetry producer having parameters that are compatible with the parameters of the telemetry consumer 106. Once found, the telemetry registration controller 204 sends the telemetry producer ID of the telemetry producer having compatible parameter to the telemetry consumer 106. When the telemetry consumer is registered, and has received the telemetry producer ID for the compatible telemetry producer, the telemetry consumer 106 may subscribe to receive telemetry data, produced by the compatible telemetry producer, from a telemetry message broker as described above with reference to FIG. 1.

Figure 5A:
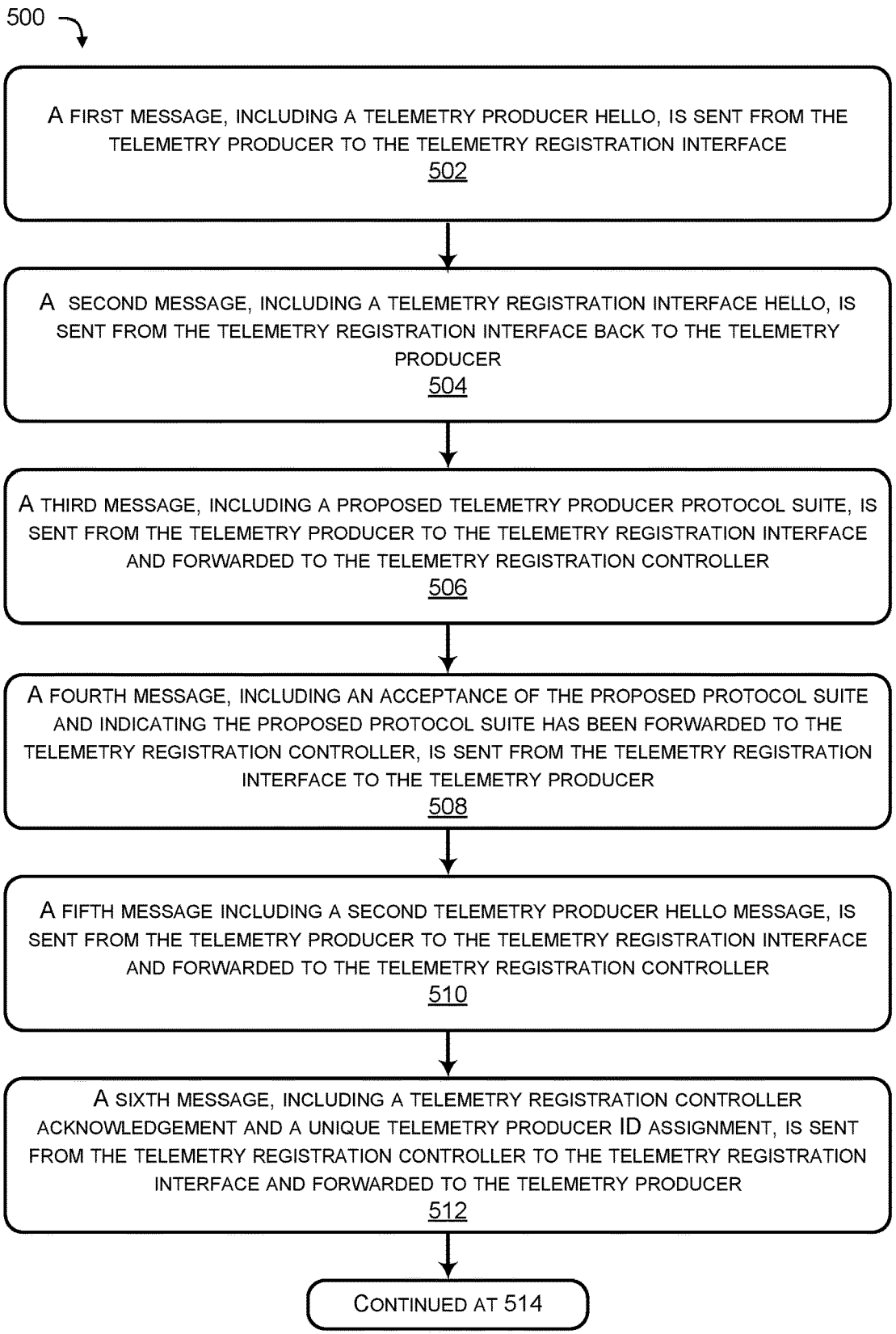
FIG. 5a-5b illustrate a flow diagram of an example method for registering a telemetry producer and a telemetry consumer with a telemetry registration framework.
Figure 5B:
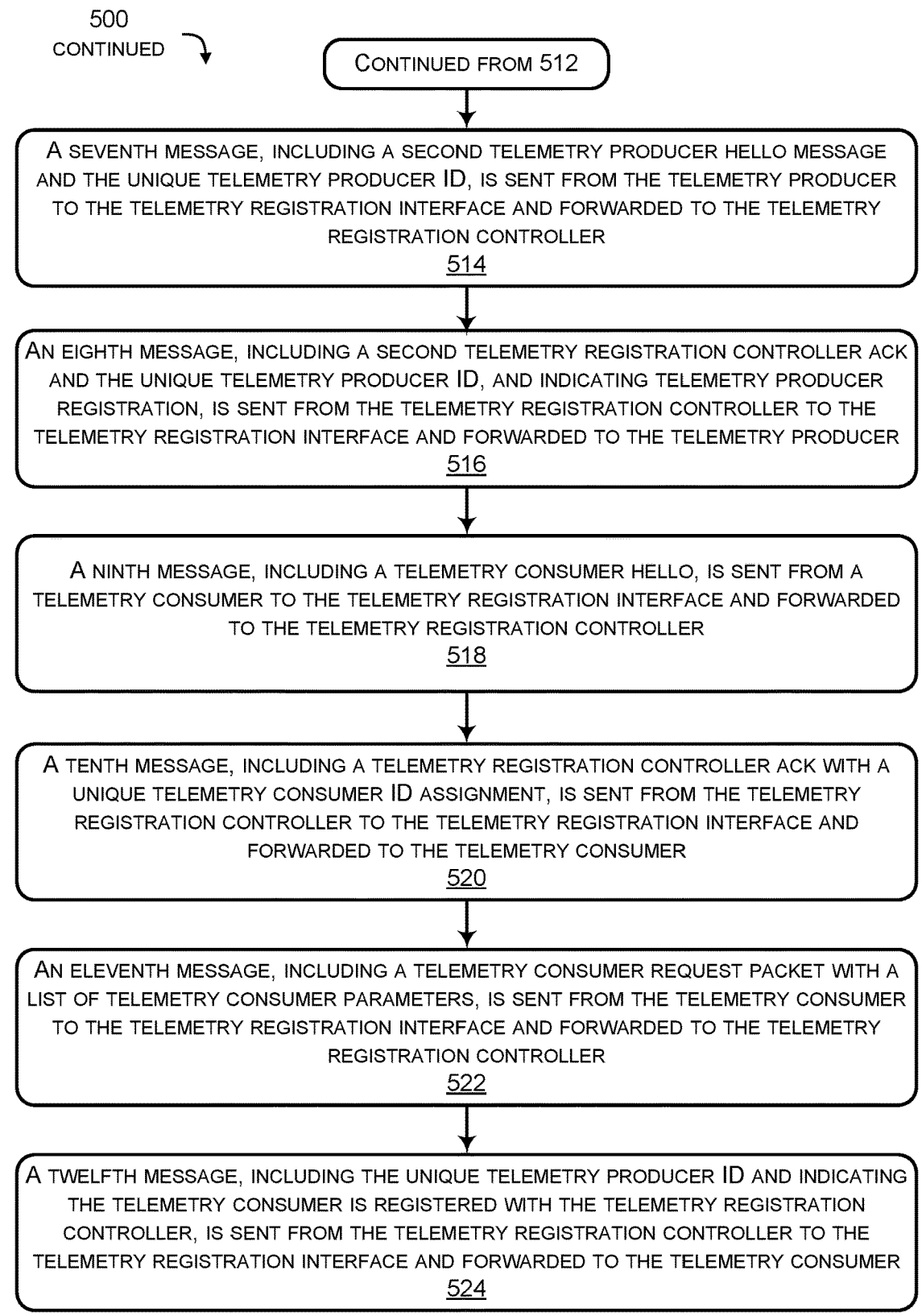

FIG. 5a-5b illustrates a process 500 for registering a telemetry producer and a telemetry consumer with a telemetry registration framework using a registration interface protocol. The process 500 can be performed, at least in part, in a network environment as described above with reference to FIG. 1 and using the telemetry registration framework as described above with reference to FIG. 2.

At operation 502, a first message, including a telemetry producer hello, is sent from the telemetry producer to a telemetry registration interface. The telemetry producer initiates communication with the telemetry registration interface in order to begin the registration process with the telemetry registration framework.

At operation 504, a second message, including a telemetry registration interface hello, is sent from the telemetry registration interface back to the telemetry producer. Once the telemetry registration interface successfully receives the telemetry producer hello message, the telemetry registration interface returns a hello message to the telemetry producer. At this point, the telemetry producer and telemetry registration interface have established successful communication and can continue the telemetry producer registration process. If the telemetry registration interface does not return a hello message to the telemetry producer, the telemetry producer registration process fails.

At operation 506, a third message, including a telemetry producer protocol suite, is sent from the telemetry producer to the telemetry registration interface and forwarded to the telemetry registration controller. The telemetry producer protocol suite includes a list of all the types of all the parameters the telemetry producer can utilize to produce telemetry data. For example, the primary parameters included in the telemetry producer protocol suite are a type of collection protocol, a number of keys or how many types of data can be collected, a serialization or messaging format, available sensor paths, and a hashing mechanism. In some example, the producer protocol suite also includes secondary parameters such as type of operating system, security of collection, and device vendor.

At operation 508, a fourth message, including an acceptance of the protocol suite and an indication the protocol suite has been forwarded to the telemetry registration controller, is sent from the telemetry registration interface to the telemetry producer.

At operation 510, a fifth message including a second telemetry producer hello message, is sent from the telemetry producer to the telemetry registration interface and forwarded to the telemetry registration controller. The telemetry producer initiates communication with the telemetry registration controller via the telemetry registration interface.

At operation 512, a sixth message including a telemetry registration controller acknowledgement and a unique telemetry producer ID assignment, is sent from the telemetry registration controller to the telemetry registration interface and forwarded to the telemetry producer. When the telemetry registration controller successfully receives the hello message sent from the telemetry producer, the telemetry registration controller acknowledges receipt of the hello message by sending the telemetry producer a unique ID assignment, effectively establishing communication with the telemetry producer via the telemetry registration interface. If the telemetry registration controller does not acknowledge the telemetry producer hello message, the telemetry producer registration process cannot continue.

At operation 514, a seventh message, including a second telemetry producer hello message and the unique telemetry producer ID, is sent from the telemetry producer to the telemetry registration interface and forwarded to the telemetry registration controller. When the telemetry registration controller receives this message, the telemetry registration controller effectively registers the telemetry producer as ready to collect and publish telemetry data, and stores the registration in a telemetry registration database, for example telemetry registration database 206 described above and illustrated in FIG. 2.

At operation 516, an eighth message, including a second telemetry registration controller acknowledgement and the unique telemetry producer ID, and indicating the telemetry producer registration, is sent from the telemetry registration controller to the telemetry registration interface and forwarded to the telemetry producer.

At operation 518, a ninth message, including a telemetry consumer hello, is sent from a telemetry consumer to the telemetry registration interface and forwarded to the telemetry registration controller. The telemetry consumer initiates communication with the telemetry registration controller via the telemetry registration interface to begin the registration process.

At operation 520, a tenth message, including a telemetry registration controller acknowledgement with a unique telemetry consumer ID assignment, is sent from the telemetry registration controller to the telemetry registration interface and forwarded to the telemetry consumer. The telemetry registration controller acknowledges successful communication with the telemetry consumer via the telemetry registration interface and send the telemetry consumer their unique telemetry consumer ID assignment. If the telemetry registration controller does not acknowledge the hello message sent by the telemetry consumer, the telemetry consumer registration process will fail.

At operation 522, an eleventh message, including a telemetry consumer request packet with a list of telemetry consumer parameters, is sent from the telemetry consumer to the telemetry registration interface and forwarded to the telemetry registration controller. The telemetry consumer request packet includes a list of all the types of all the parameters the telemetry consumer can utilize to consume telemetry data. The primary parameters included are a type of collection protocol, a number of keys or how many types of data can be collected, a serialization or messaging format, available sensor paths, and a hashing mechanism. When the telemetry registration controller receives this message, the telemetry registration controller effectively registers the telemetry consumer and store the registration in the telemetry database.

At operation 524, a twelfth message, including the unique telemetry producer ID and indicating the telemetry consumer is registered with the telemetry registration controller, is sent from the telemetry registration controller to the telemetry registration interface and forwarded to the telemetry consumer. Once the telemetry consumer receives the telemetry producer ID of a compatible telemetry producer, the telemetry consumer can subscribe to telemetry data published by the compatible telemetry producer through a telemetry message broker, for example the telemetry message broker described and illustrated above with reference to FIG. 1.

Figure 6:
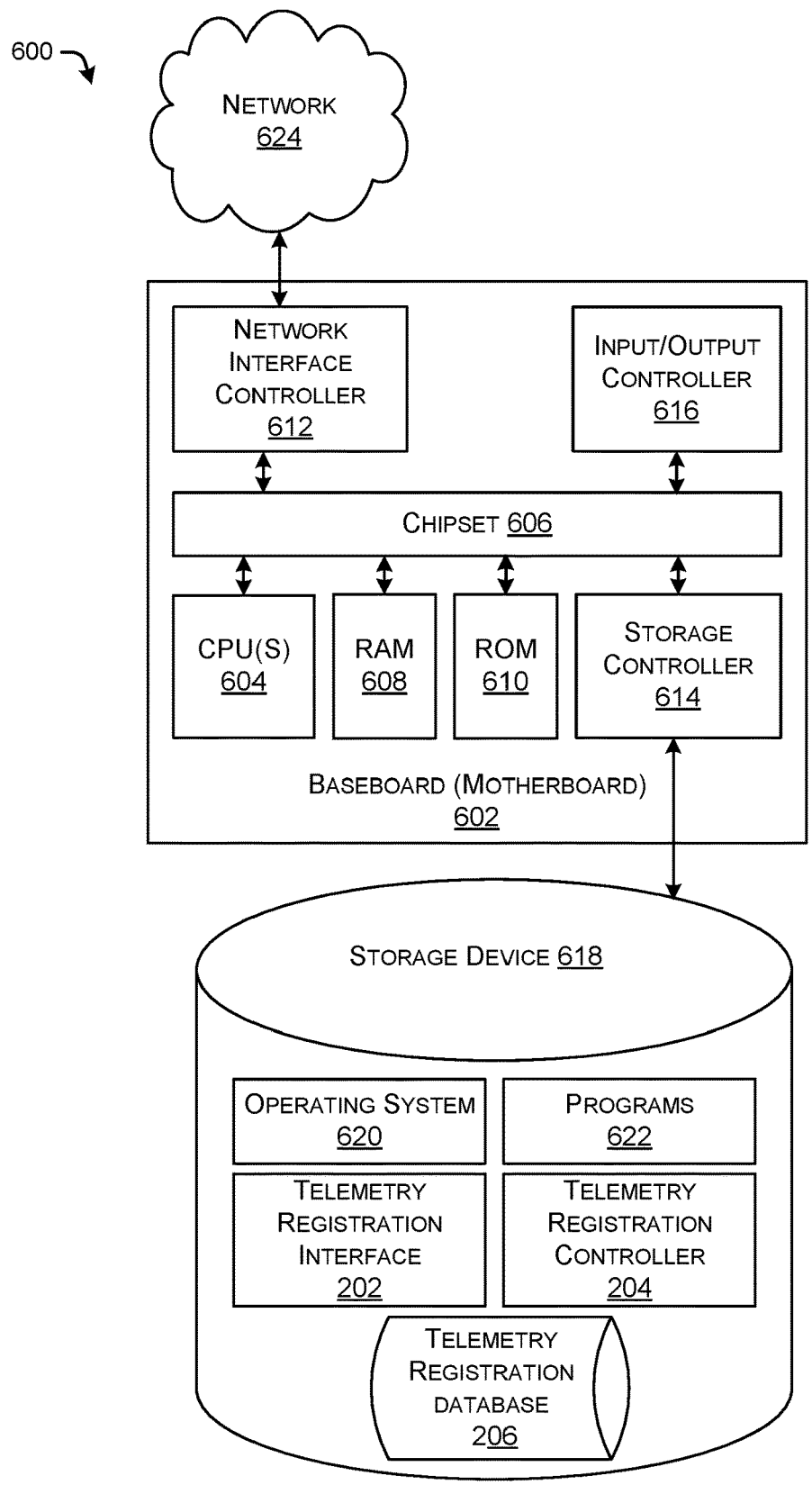
FIG. 6 is a computer architecture diagram showing an illustrative computer hardware architecture for implementing a telemetry registration framework that can be utilized to implement aspects of the various technologies presented herein.

FIG. 6 shows an example computer architecture diagram illustrating computer hardware architecture for implementing a device 600 capable of implementing the functionality described herein. The telemetry registration interface 202, the telemetry registration controller 204, and the telemetry registration database 206 described above, may include some or all of the components discussed below with reference to the device 600.

The device 600 includes a baseboard 602, or "motherboard," which is a printed circuit board to which a multitude of components or devices can be connected by way of a system bus or other electrical communication paths. In one illustrative configuration, one or more central processing units (CPUs) 604 operate in conjunction with a chipset 606. The CPUs 604 can be standard programmable processors that perform arithmetic and logical operations necessary for the operation of the device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a random-access memory (RAM) 608, used as the main memory in the device 600. The chipset 606 can further provide an interface to a computer-readable storage medium such as a read-only memory (ROM) 610 or non-volatile RAM (NVRAM) for storing basic routines that help to startup the device 600 and to transfer information between the various components and devices. The ROM 610 or NVRAM can also store other software components necessary for the operation of the device 600 in accordance with the configurations described herein.

The device 600 can operate in a networked environment using logical connections to remote computing devices and computer systems through a network, such as a local area network 624. The chipset 606 can include functionality for providing network connectivity through a Network Interface Card (NIC) 612, such as a gigabit Ethernet adapter. The NIC 612 is capable of connecting the device 600 to other computing devices over the network. It should be appreciated that multiple NICs 612 can be present in the device 600, connecting the computer to other types of networks and remote computer systems.

The device 600 can be connected to a storage device 618 that provides non-volatile storage for the computer. The storage device 618 can store an operating system 620, programs 622, and data, which have been described in greater detail herein. The storage device 618 can be connected to the device 600 through a storage controller 614 connected to the chipset 606. The storage device 618 can consist of one or more physical storage units. The storage controller 614 can interface with the physical storage units through a serial attached SCSI (SAS) interface, a serial advanced technology attachment (SATA) interface, an FC interface, or other type of interface for physically connecting and transferring data between computers and physical storage units.

The device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The device 600 can further read information from the storage device 618 by detecting the physical states or characteristics of one or more particular locations within the physical storage units.

In addition to the storage device 618 described above, the device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 600.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the device 600. According to one embodiment, the operating system comprises the LINUX™ operating system. According to another embodiment, the operating system includes the WINDOWS' SERVER operating system from MICROSOFT Corporation of Redmond, Washington. According to further embodiments, the operating system can comprise the UNIX' operating system or one of its variants. It should be appreciated that other operating systems can also be utilized. The storage device 618 can store other system or application programs and data utilized by the device 600.

In one embodiment, the storage device 618 or other computer-readable storage media is encoded with computer-executable instructions which, when loaded into the device 600, transform the computer from a general-purpose computing system into a special-purpose computer capable of implementing the embodiments described herein. These computer-executable instructions transform the device 600 by specifying how the CPUs 604 transition between states, as described above. According to one embodiment, the device 600 has access to computer-readable storage media storing computer-executable instructions which, when executed by the device 600, perform the various processes described above with reference to FIGS. 1-5b. The device 600 can also include computer-readable storage media having instructions stored thereupon for performing any of the other computer-implemented operations described herein.

The device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the device 600 might not include all of the components shown in FIG. 6, can include other components that are not explicitly shown in FIG. 6, or might utilize an architecture completely different than that shown in FIG. 6.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing computer-executable instructions that, when executed by the one or more processors, cause the one or more processors to perform acts comprising:
assigning, by a telemetry registration controller, a unique telemetry producer identifier (ID) to a telemetry producer wherein the telemetry registration controller is part of a telemetry registration framework and separate from a telemetry message broker;
registering a telemetry producer protocol suite and parameters associated with the telemetry producer with the telemetry registration controller, wherein the telemetry producer protocol suite includes at least a list of types of operating systems the telemetry producer can support, a list of collection security the telemetry producer can support, and a list of device vendors the telemetry producer is compatible with;
storing the telemetry producer ID, the telemetry protocol suite, and the parameters associated with the telemetry producer in a telemetry registration database, wherein the telemetry registration database is part of the telemetry registration framework and separate from the telemetry message broker;
assigning, by the telemetry registration controller, a unique telemetry consumer ID to a telemetry consumer;
registering parameters associated with the telemetry consumer with the telemetry registration controller;
storing the telemetry consumer ID and the parameters associated with the telemetry consumer in the telemetry registration database;
determining, by the telemetry registration controller, that the parameters associated with the telemetry producer are compatible with the telemetry producer protocol suite and the parameters associated with the telemetry consumer; and
transmitting, by the telemetry registration controller, a message to the telemetry consumer comprising the telemetry producer ID and indicating the telemetry consumer can subscribe to telemetry data from the telemetry message broker that has been published by the telemetry producer.

2. The system of claim 1, wherein the telemetry registration controller is capable of registering multiple telemetry producers and multiple telemetry consumers concurrently.

3. The system of claim 1, wherein the telemetry registration controller is a centralized controller with a scale-out architecture.

4. The system of claim 1, wherein the telemetry registration database is a strongly consistent key value database.

5. A system comprising:
one or more processors; and
one or more non-transitory computer-readable media storing computer-executable instructions that, when executed by the one or more processors, cause the one or more processors to perform acts comprising:
receiving, by a telemetry registration interface and from a telemetry producer, a first message comprising a telemetry producer hello message;
transmitting, by the telemetry registration interface and to the telemetry producer, a second message comprising a telemetry registration interface hello message;
receiving, by the telemetry registration interface and from the telemetry producer, a third message comprising a telemetry producer protocol suite, wherein the telemetry producer protocol suite includes at least a list of types of operating systems the telemetry producer can support, a list of collection security the telemetry producer can support, and a list of device vendors the telemetry producer is compatible with;
transmitting, by the telemetry registration interface and to a telemetry registration controller, the third message, wherein the telemetry registration interface and the telemetry registration controller are part of a telemetry registration framework that is separate from a telemetry message broker;
transmitting, by the telemetry registration interface and to the telemetry producer, a fourth message comprising an acceptance of the telemetry producer protocol suite and indicating the telemetry producer protocol suite has been forwarded to the telemetry registration controller;
receiving, by the telemetry registration interface and from the telemetry producer, a fifth message comprising a second telemetry producer hello message;
transmitting, by the telemetry registration interface and to the telemetry registration controller, the fifth message;
receiving, by the telemetry registration interface and from the telemetry registration controller, a sixth message comprising a telemetry registration controller acknowledgement and an assignment of a unique telemetry producer identifier (ID);
transmitting, by the telemetry registration interface and to the telemetry producer, the sixth message;
receiving, by the telemetry registration interface and from the telemetry producer, a seventh message comprising a third telemetry producer hello message with the unique telemetry producer ID;
transmitting, by the telemetry registration interface and to the telemetry registration controller, the seventh message;
transmitting, by the telemetry registration controller and to a telemetry registration database, an eighth message comprising instructions to store a telemetry producer registration for the telemetry producer comprising the telemetry producer protocol suite and the unique telemetry producer ID;
storing, by the telemetry registration database, the telemetry producer registration for the telemetry producer comprising the telemetry producer protocol suite and the unique telemetry producer ID;
receiving, by the telemetry registration interface and from the telemetry registration controller, a ninth message comprising a second telemetry registration controller acknowledgement and the unique telemetry producer ID, indicating acceptance a registration of the telemetry producer with the telemetry registration controller; and
transmitting, by the telemetry registration interface and to the telemetry producer, the eighth message.

6. The system of claim 5, wherein the computer-readable media is further configured to cause the one or more processors to perform acts comprising:
receiving, by the telemetry registration interface and from a telemetry consumer, a first message comprising a telemetry consumer hello message;
transmitting, by the telemetry registration interface and to the telemetry registration controller, the first message;
receiving, by the telemetry registration interface and from the telemetry registration controller, a second message comprising a telemetry registration controller acknowledgement with an assignment of a unique telemetry consumer identifier (ID) for the telemetry consumer;

transmitting by the telemetry registration interface and to the telemetry consumer, the second message;

receiving, by the telemetry registration interface and from the telemetry consumer, a third message comprising a telemetry consumer request packet with a list of telemetry consumer parameters the telemetry consumer is capable of utilizing to consume telemetry data;

transmitting, by the telemetry registration interface and to the telemetry registration controller, the third message;

transmitting, by the telemetry registration controller and to the telemetry registration database, a fourth message comprising instructions to store a telemetry consumer registration for the telemetry consumer comprising the list of telemetry consumer parameters the telemetry consumer is capable of utilizing to consume telemetry data and the unique telemetry consumer ID;

storing, by the telemetry registration database, the telemetry consumer registration for the telemetry consumer comprising the list of telemetry consumer parameters the telemetry consumer is capable of utilizing to consume telemetry data and the unique telemetry consumer ID;

querying the telemetry registration database for a telemetry producer capable of producing telemetry data compatible with the list of telemetry consumer parameters the telemetry consumer is capable of utilizing to consume telemetry data;

receiving, by the telemetry registration controller and from the telemetry registration database, a fifth message comprising a telemetry producer ID associated with a telemetry producer having a telemetry producer protocol suite compatible with the list of telemetry consumer parameters the telemetry consumer is capable of utilizing to consume telemetry data;

receiving, by the telemetry registration interface and from the telemetry registration controller, the fifth message; and transmitting, by the telemetry registration interface and to the telemetry consumer, the fifth message.

7. The system of claim 6, further comprising, transmitting by the telemetry consumer and to a telemetry message broker, a sixth message requesting telemetry data that has been published by the telemetry producer associated with the telemetry producer D.

8. The system of claim 6, wherein the list of telemetry consumer parameters the telemetry consumer is capable of utilizing to consume telemetry data comprises:

a list of types of collection protocol that the telemetry consumer can support;

a number of unique keys in a telemetry message;

a list of available serialization formats the telemetry consumer can support;

a list of available sensor paths; and a list of available hashing mechanisms the telemetry consumer is compatible with.

9. The system of claim 6, wherein registering a telemetry consumer with the telemetry registration controller is a first telemetry consumer and the list of telemetry consumer parameters is a first list of telemetry consumer parameters, and further comprising registering a second telemetry consumer with the telemetry registration controller wherein a second list of telemetry consumer parameters the second telemetry consumer is capable of utilizing is different that the first list of telemetry consumer parameters the first telemetry consumer is capable of utilizing.

10. The system of claim 9, wherein a telemetry producer ID associated with a telemetry producer capable of producing telemetry data compatible with the second list of telemetry consumer parameters the second telemetry consumer is capable of utilizing is a same telemetry producer ID associated with a same telemetry producer capable of producing telemetry data compatible with the first list of telemetry consumer parameters the first telemetry consumer is capable of utilizing.

11. The system of claim 5, wherein the telemetry registration controller is capable of registering multiple telemetry producers concurrently.

12. The system of claim 5, wherein the telemetry registration interface is a multi-protocol registration interface.

13. A method for registering a telemetry producer and a telemetry consumer with a telemetry registration controller, the method implemented at least in part by a telemetry registration interface, the method comprising:

receiving, from the telemetry producer, a first message comprising a telemetry producer hello message;

transmitting, to the telemetry producer, a second message comprising a telemetry registration interface hello message;

receiving, from the telemetry producer, a third message comprising a telemetry producer protocol suite, wherein the telemetry producer protocol suite includes at least a list of types of operating systems the telemetry producer can support, a list of collection security the telemetry producer can support, and a list of device vendors the telemetry producer is compatible with;

transmitting, to the telemetry registration controller, the third message, wherein the telemetry registration controller is part of a telemetry registration framework and separate from a telemetry message broker;

transmitting, to the telemetry producer, a fourth message comprising an acceptance of the telemetry producer protocol suite and indicating the telemetry producer protocol suite has been forwarded to the telemetry registration controller;

receiving, from the telemetry producer, a fifth message comprising a second telemetry producer hello message;

transmitting, to the telemetry registration controller, the fifth message;

receiving, from the telemetry registration controller, a sixth message comprising a telemetry registration controller acknowledgement and a unique telemetry producer identifier (ID) assignment;

transmitting, to the telemetry producer, the sixth message;

receiving, from the telemetry producer, a seventh message comprising a second telemetry producer hello message and the unique telemetry producer ID;

transmitting, to the telemetry registration controller, the seventh message;

receiving, from the telemetry registration controller, an eighth message comprising a second telemetry registration controller acknowledgement and the unique telemetry producer ID, indicating the telemetry producer is registered with the telemetry registration controller; and transmitting, to the telemetry producer, the eighth message.

14. The method of claim 13 further comprising:

receiving, from the telemetry consumer, a ninth message comprising a telemetry consumer hello message;

transmitting, to the telemetry registration controller, the ninth message;

receiving, from the telemetry registration controller, a tenth message comprising a telemetry registration controller acknowledgement with a unique telemetry consumer identifier (ID) assignment;

transmitting, to the telemetry consumer, the tenth message;

receiving, from the telemetry consumer, an eleventh message comprising a telemetry consumer request packet with a list of telemetry consumer parameters the telemetry consumer is capable of utilizing to consume telemetry data;

transmitting, to the telemetry registration controller, the eleventh message;

receiving, from the telemetry registration controller, a twelfth message comprising the unique telemetry producer ID and indicating the telemetry consumer is registered with the telemetry registration controller; and transmitting, to the telemetry consumer, the twelfth message.

15. The method of claim 14, wherein the telemetry consumer request packet with a list of telemetry consumer parameters the telemetry consumer is capable of utilizing to consume telemetry data comprises:

a list of types of collection protocol that the telemetry consumer can support;

a number of keys that can be collected;

a list of available serialization formats the telemetry consumer can support;

a list of available sensor paths; and a list of available sensor paths; and a list of available hashing mechanisms the telemetry consumer is compatible with.

16. The method of claim 13, wherein the telemetry producer protocol suite further comprises:

a list of types of operating systems the telemetry producer can support;

a list of collection security the telemetry producer can support;

and a list of device vendors the telemetry producer is compatible with.

17. The method of claim 13, wherein the method is initiated at runtime.

18. The method of claim 13, wherein the telemetry registration controller is capable of registering multiple telemetry producers and multiple telemetry consumers concurrently.

19. The method of claim 13, wherein the telemetry producer is compatible with multiple telemetry consumers having a variety of telemetry consumer parameters.

* * * * *